United States Patent
Ichikawa (10) Patent No.: US 12,153,996 B2
(45) Date of Patent: Nov. 26, 2024

(54) CODE READING DEVICE, PROGRAM RECORDING MEDIUM, CODE READING SYSTEM, AND CODE READING METHOD

(71) Applicant: Toshiba Tec Kabushiki Kaisha, Tokyo (JP)

(72) Inventor: Takashi Ichikawa, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/330,172

(22) Filed: Jun. 6, 2023

(65) Prior Publication Data

US 2023/0316023 A1    Oct. 5, 2023

Related U.S. Application Data

(63) Continuation of application No. PCT/JP2022/006700, filed on Feb. 18, 2022.

(30) Foreign Application Priority Data

Mar. 10, 2021   (JP) ................. 2021-038387

(51) Int. Cl.
G06K 7/14    (2006.01)
(52) U.S. Cl.
CPC .................... *G06K 7/1413* (2013.01)
(58) Field of Classification Search
CPC .... G06K 7/1413; G06K 7/14; G06K 7/10861; G06K 7/00; G06K 7/1447
USPC ........ 235/462.01, 462.07, 454, 375
See application file for complete search history.

(56) References Cited

U.S. PATENT DOCUMENTS

| | | | |
|---|---|---|---|
| 9,177,217 B2 | 11/2015 | Sasaki et al. | |
| 2001/0054005 A1* | 12/2001 | Hook | G06Q 20/201 |
| | | | 705/20 |
| 2008/0249884 A1 | 10/2008 | Knowles et al. | |
| 2009/0250516 A1 | 10/2009 | Tsuchiya et al. | |

(Continued)

FOREIGN PATENT DOCUMENTS

| | | |
|---|---|---|
| JP | 3047598 U | 4/1998 |
| JP | 2012-119005 A | 6/2012 |

(Continued)

OTHER PUBLICATIONS

English Translation of International Preliminary Report on Patentability (Chapter I) and Written Opinion mailed Sep. 21, 2023 in International Application No. PCT/JP2022/006700, 5 pages.

(Continued)

*Primary Examiner* — Edwyn Labaze
(74) *Attorney, Agent, or Firm* — Kim & Stewart LLP (57) ABSTRACT

In an embodiment, a code reading device reads a code from an image of a product. The code reading device determines whether or not a label displaying price change information is affixed to the product. If the label is not affixed to the product, the code reading device outputs the code to a processing device. If the label is affixed to the product, the code reading device transmits an image of the product to an image recognition server. The code reading device outputs the price change information recognized by the image recognition server to the processing device together with the code.

12 Claims, 7 Drawing Sheets

(56) References Cited

U.S. PATENT DOCUMENTS

2014/0246487 A1    9/2014  Mihara et al.
2017/0140362 A1    5/2017  Yamaguchi et al.
2018/0181940 A1    6/2018  Fujiwara et al.

FOREIGN PATENT DOCUMENTS

WO    2015/147329 A1    10/2015
WO    2016/002696 A1    1/2016

OTHER PUBLICATIONS

International Search Report (ISR) and Written Opinion mailed Apr. 5, 2022 in International Application No. PCT/JP2022/006700, with Translation of the ISR, 8 pages.
Extended European Search Report mailed Jul. 8, 2024 in corresponding European Patent Application No. 22766785.4, 8 pages.
Request for the Submission of an Opinion (Office Action) mailed Aug. 12, 2024 in corresponding Korean Patent Application No. 10-2023-7019291 with English machine translation, 10 pages.

\* cited by examiner

CODE READING DEVICE, PROGRAM RECORDING MEDIUM, CODE READING SYSTEM, AND CODE READING METHOD

CROSS-REFERENCE TO RELATED APPLICATIONS

This application is a Continuation Application of PCT Application No. PCT/JP2022/006700, filed Feb. 18, 2022 and based upon and claiming the benefit of priority from Japanese Patent Application No. 2021-038387, filed Mar. 10, 2021, the entire contents of all of which are incorporated herein by reference.

FIELD

Embodiments described herein relate generally to a code reading device, a program recording medium, a code reading system, and a code reading method.

BACKGROUND

There is a code reading device that reads a bar code affixed to a product from an image of the product captured by an imaging device and outputs bar code data to a processing device of product sales data. In addition, there is also known a code reading device that, when it is detected from an image of a product on which a label displaying price change information related to a change in price is affixed, recognizes the price change information displayed on the label, and outputs the price change information to a processing device together with bar code data. With such a code reading device, an operator holds the product over a reading window of the imaging device so that the bar code and the label affixed to the product are captured. As a result, in the processing device, the product sales data is processed at the changed price. However, the code reading device recognizes the price change information displayed on the label created in a predetermined format, but does not recognize price change information displayed on a label created in a format different from the predetermined format. Thus, in a case of changing the format of the label, it is necessary to change an algorithm of image recognition provided in the code reading device.

In recent years, with improvements in image recognition technology, an image recognition server capable of recognizing information from various images has been developed. Therefore, it is being considered to connect such an image recognition server to the code reading device and to entrust the image recognition of the label to the image recognition server, so that it is not necessary to change the algorithm of the image recognition provided in the code reading device. However, in such a method, it is necessary to transmit the image of the product captured by the imaging device from the code reading device to the image recognition server regardless of whether or not the label is affixed to the product. Thus, a data communication amount of the communication network connecting the code reading device and the image recognition server becomes enormous. In addition, since the product to be labeled is considered to be a small part, there is a concern that most data communication is wasted.

DETAILED DESCRIPTION

In an embodiment, a code reading device includes an acquisition unit, a reading unit, a determination unit, a transmission unit, a reception unit, and an output unit. The acquisition unit is configured to acquire an image of a product captured by an imaging device. The reading unit is configured to read a code for obtaining a price of the product from the image of the product acquired by the acquisition unit. The determination unit is configured to determine whether or not a label displaying price change information related to a change in the price obtained by the code is affixed to the product. The transmission unit is configured to transmit the image of the product to an image recognition server for recognizing the price change information displayed on the label if the determination unit determines that the label is affixed to the product. The reception unit is configured to receive the price change information recognized by the image recognition server. The output unit is configured to output the code read by the reading unit to a processing device that processes sales data of the product if it is determined that the label is not affixed to the product. The output unit is configured to output the code read by the reading unit and the price change information received by the reception unit to the processing device if it is determined that the label is affixed to the product.

Hereinafter, some embodiments will be described with reference to the drawings.

First Embodiment

First, a first embodiment will be described with reference to FIGS. 1 to 5.

Figure 1:
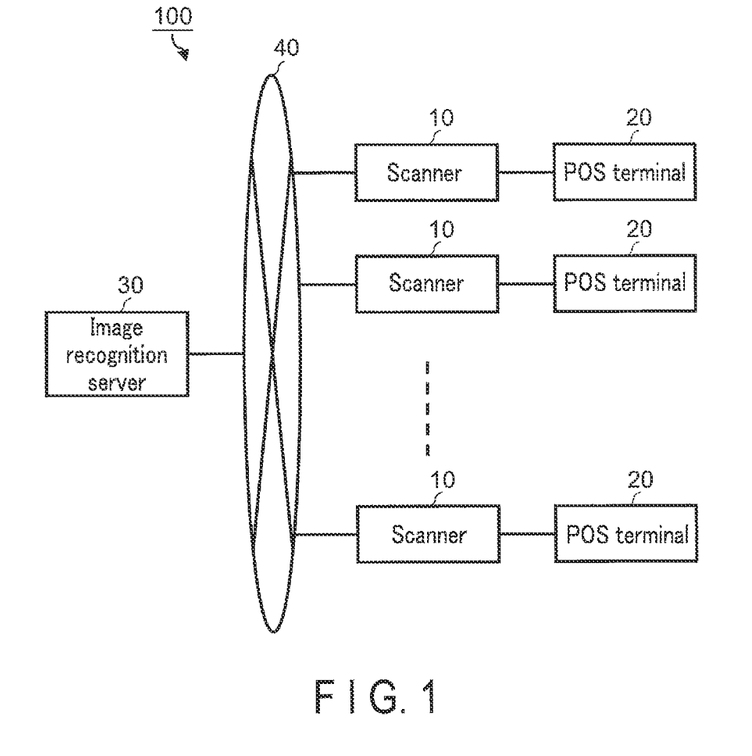
FIG. 1 is an overall configuration diagram of a code reading system according to an embodiment.

FIG. 1 is an overall configuration diagram of a code reading system 100 according to an embodiment. The code reading system 100 includes a plurality of scanners 10, a plurality of POS (point of sale) terminals 20, and an image recognition server 30. The plurality of scanners 10 and POS terminals 20 correspond to each other on a one-to-one basis, and are connected to each other by communication cables. The plurality of scanners 10 and the image recognition server 30 are connected to a communication network 40. The communication network 40 is typically a local area network (LAN). The LAN may be a wired LAN or a wireless LAN. The communication network 40 may be, for example, the Internet, and the image recognition server 30 may be a cloud computing server.

The scanner 10 is an example of a code reading device that reads a bar code from an image of a product captured by an imaging device. The bar code is a bar code of a product code uniquely set for each product in order to identify each product, and is usually affixed to a case, a package, or the like of the product. The scanner 10 outputs data of the read bar code to the POS terminal 20. The scanner 10 may read a code such as a two-dimensional data code or a character code instead of the bar code.

The POS terminal 20 acquires a product code from the data of the bar code read by the scanner 10. The POS terminal 20 acquires a price set in a price master in association with the product code, and registers sales data of that product based on that price. That is, the bar code is a code for obtaining the price of the product. The POS terminal 20 is an example of a processing device that processes product sales data. Since such a POS terminal 20 is well known, a detailed description thereof will be omitted.

Figure 2:
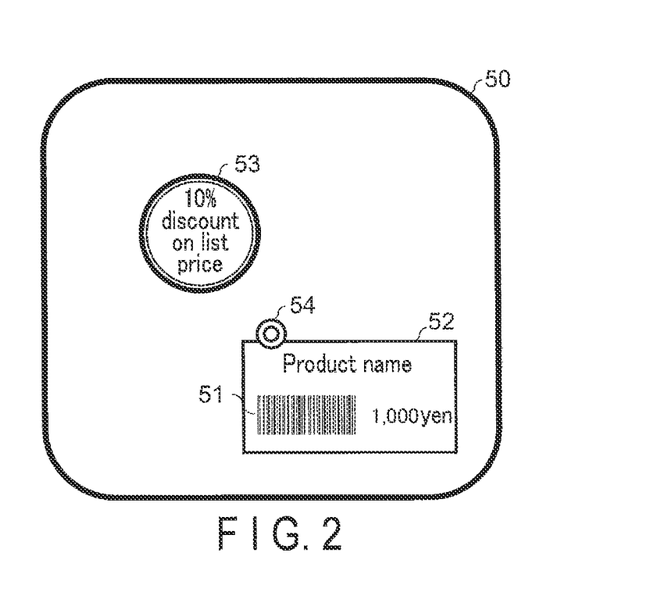
FIG. 2 is a schematic diagram showing an example of a product according to the embodiment.

FIG. 2 is a schematic diagram showing an example of a product 50 according to the present embodiment. The product 50 is a price change target product that is sold at a discount of 10% from a normal price. As shown in FIG. 2, a bar code label 52 displaying a bar code 51 together with a product name and the normal price is affixed to a case or a package of the product 50. The bar code label 52 may be printed on the case or the package, or may be attached to the case or the package as a seal-like label. A price change label 53 and a flag seal 54 are affixed to the same surface of the product 50 as the bar code label 52. The price change label 53 is attached to the case or the package as a seal-like label. The same applies to the flag seal 54.

The price change label 53 is a label displaying price change information related to a change in price. The price change label 53 in FIG. 2 displays price change information for discounting the price at a rate of 10%. The price change information is not limited to the information on the discount rate. For example, the price change information may be information on a discount amount for discounting the price, selling price information for changing the price to a predetermined selling price, information on an extra rate for increasing the price, or the like.

The flag seal 54 indicates that the price change label 53 is affixed to the product 50, and is attached to the product 50 as a pair with the price change label 53. As shown in FIG. 2, at least a part of the flag seal 54 is attached to overlap the bar code label 52. The flag seal 54 may not necessarily be attached over the bar code label 52. The flag seal 54 may be attached so as to be in contact with an edge of the bar code label 52, for example. In short, the flag seal 54 may be attached in the vicinity of the bar code label 52. On the other hand, the price change label 53 may not necessarily be attached in the vicinity of the bar code label 52. In this connection, the flag seal 54 is not affixed to a product which is not a price change target. Basically, only the bar code label 52 is affixed to the product which is not a price change target.

Figure 3:
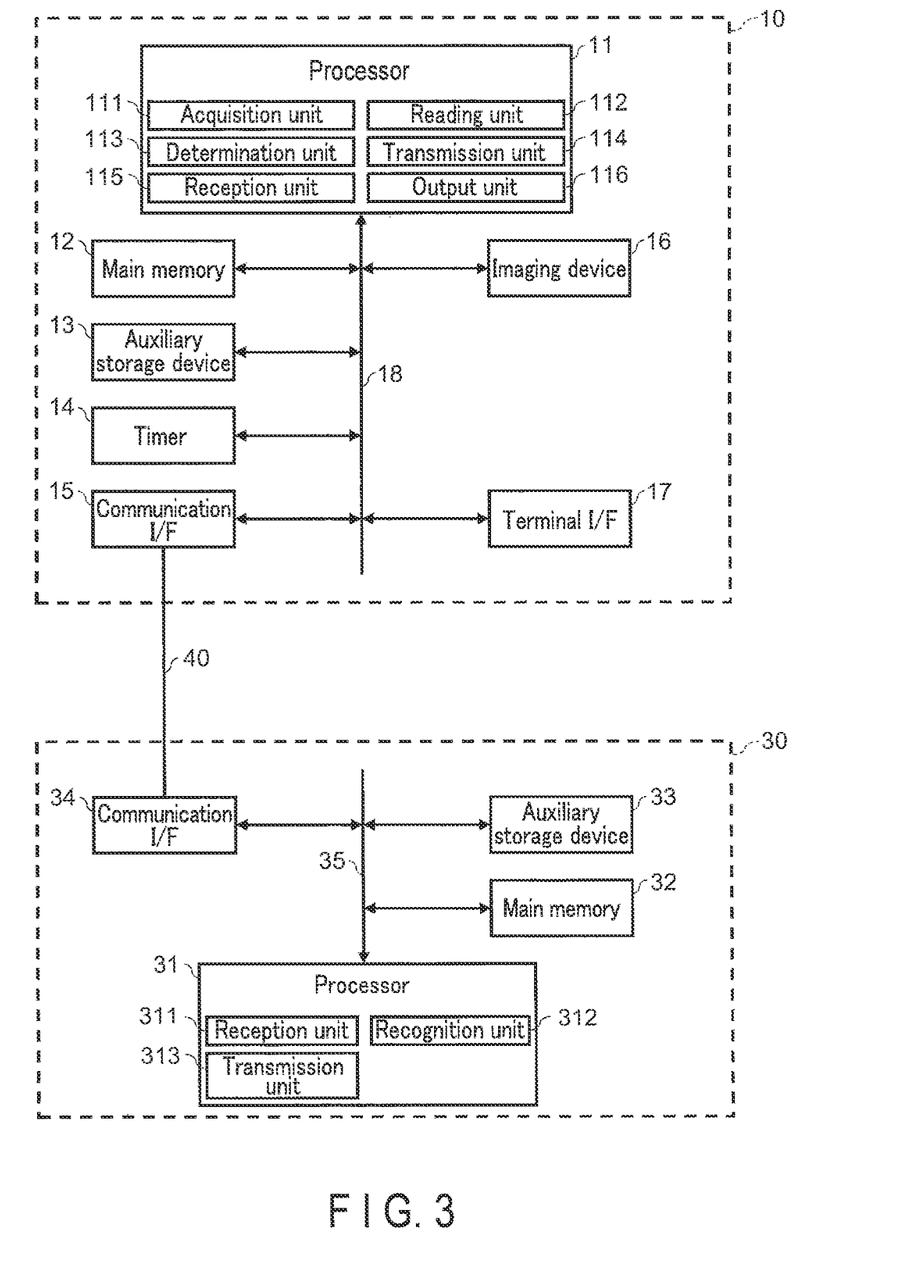
FIG. 3 is a block diagram showing a main circuit configuration of a scanner and an image recognition server in a first embodiment.

FIG. 3 is a block diagram showing a main circuit configuration of the scanner 10 and the image recognition server 30. In FIG. 3, only one scanner 10 is shown. Since the other scanners 10 have the same configuration, descriptions thereof will be omitted.

The scanner 10 includes a processor 11, a main memory 12, an auxiliary storage device 13, a timer 14, a communication interface 15, an imaging device 16, and a terminal interface 17. The processor 11, the main memory 12, the auxiliary storage device 13, the timer 14, the communication interface 15, the imaging device 16, and the terminal interface 17 are connected by a system transmission line 18. The system transmission line 18 includes an address bus, a data bus, a control signal line, etc. The scanner 10 forms a computer by connecting the processor 11, the main memory 12, the auxiliary storage device 13, and the timer 14 via the system transmission line 18. By connecting the communication interface 15, the imaging device 16, and the terminal interface 17 to this computer, a function as the scanner 10 is realized.

The processor 11 corresponds to a central part of the above computer. The processor 11 controls each unit to realize various functions as the scanner 10 according to an operating system or an application program. The processor 11 may be processing circuitry such as a central processing unit (CPU), a graphics processing unit (GPU), an application specific integrated circuit (ASIC), or a programmable logic device (for example, a simple programmable logic device (SPLD), a complex programmable logic device (CPLD), or a field programmable gate array (FPGA)). The processor 11 is not limited to a case in which it is formed as a single processing circuit, and a plurality of processing circuits may be combined into the processor 11. The same applies to the other processors according to the present embodiment.

The main memory 12 may be a volatile memory (random access memory) or a non-volatile memory (read-only memory, non-volatile random access memory). The main memory 12 stores an information processing program and data necessary for information processing. The processor 11 realizes a predetermined function by reading and executing a program stored in the main memory 12. Instead of storing a program in the main memory 12, the program may be directly embedded in the processor 11. In this case, the processor 11 realizes a predetermined function by reading and executing a program embedded inside. Further, the predetermined function may be realized not only by the processor 11 executing a program, but also by a combination of logic circuits. The same applies to the other main memories according to the present embodiment.

The auxiliary storage device 13 corresponds to an auxiliary storage portion of the above computer. As the auxiliary storage device 13, for example, a well-known storage device such as a solid-state drive (SSD), a hard disc drive (HDD), or an electrically erasable programmable read-only memory (EEPROM) (registered trademark) is used alone or in combination of a plurality of storage devices. The auxiliary storage device 13 stores data used when the processor 11 performs various types of processing, data created by processing in the processor 11, or the like. The auxiliary storage device 13 may store the information processing program described above.

The information processing program stored in the main memory 12 or the auxiliary storage device 13 includes a code reading program. A method of installing the code reading program in the main memory 12 or the auxiliary storage device 13 is not particularly limited. The code reading program can be installed in the main memory 12 or the auxiliary storage device 13 by recording a control program in a removable recording medium or by distributing the code reading program through communication via a network. The recording medium may be in any form as long as it can store a program and can be read by the device, such as an SD memory card or a USB memory.

The timer 14 is a device that starts counting time in response to an activation signal and outputs a timeout signal when the counted time reaches a predetermined timeout time. In the present embodiment, the timeout time is an operation time required for the image recognition server 30 to recognize the price change information displayed on the price change label 53 from the image of the product.

The communication interface 15 is an interface with the image recognition server 30. The communication interface 15 transmits and receives data signals to and from the image recognition server 30 connected via the communication network 40 according to a predetermined communication protocol.

The imaging device 16 has a charge coupled device (CCD) image pickup element which is an area image sensor, a drive circuit for driving this CCD image pickup element, and an image pickup lens for forming an image in an image pickup area through a reading window on the CCD image pickup element, and outputs data of the image formed on the CCD image pickup element.

The terminal interface 17 is an interface with the POS terminal 20. The terminal interface 17 transmits and receives data signals to and from the POS terminal 20 connected by a communication cable.

The processor 11 has functions as an acquisition unit 111, a reading unit 112, a determination unit 113, a transmission unit 114, a reception unit 115, and an output unit 116. The acquisition unit 111 is a function of acquiring an image of a product captured by the imaging device 16. The acquisition unit 111 can also be called an acquisition means.

The reading unit 112 is a function of reading a code for obtaining a price of the product, that is, the bar code 51, from the image of the product acquired by the acquisition unit 111. As a technique for reading the bar code 51 from the image, an existing technique is used. The reading unit 112 can also be called a reading means.

The determination unit 113 has a function of determining whether or not a label displaying price change information related to a change in price obtained from the bar code 51, that is, the price change label 53, is affixed to the product. If the flag seal 54 affixed in the vicinity of the bar code 51 is detected, the determination unit 113 determines that the price change label 53 is affixed to the product. If the flag seal 54 is not detected, the determination unit 113 determines that the price change label 53 is not affixed to the product. The determination unit 113 can also be called a determination means.

The transmission unit 114 is a function of transmitting the image of the product captured by the imaging device 16 to the image recognition server 30 if the determination unit 113 determines that the price change label 53 is affixed to the product. The transmission unit 114 can also be called a terminal-side transmission unit or transmission means.

The reception unit 115 is a function of receiving price change information recognized by the image recognition server 30. The reception unit 115 can also be called a terminal-side reception unit or reception means.

The output unit 116 includes the following two functions. The first function is to output data of the bar code 51 read by the reading unit 112 to the POS terminal 20 if the determination unit 113 determines that the price change label 53 is not affixed to the product. The second function is to output the data of the bar code 51 read by the reading unit 112 and the price change information received by the reception unit 115 to the POS terminal 20 if the determination unit 113 determines that the price change label 53 is affixed to the product. The output unit 116 can also be called an output means.

The image recognition server 30 includes a processor 31, a main memory 32, an auxiliary storage device 33, and a communication interface 34. The processor 31, the main memory 32, the auxiliary storage device 33, and the communication interface 34 are connected by a system transmission line 35. The system transmission line 35 includes an address bus, a data bus, a control signal line, etc. The image recognition server 30 forms a computer by connecting the processor 31, the main memory 32, and the auxiliary storage device 33 by the system transmission line 35. By connecting the communication interface 34 to this computer, the function as the image recognition server 30 is realized.

The processor 31 corresponds to a central part of the above computer. The processor 31 controls each unit to realize various functions as the image recognition server 30 according to the information processing program. The processor 31 is, for example, a CPU.

The main memory 32 is a volatile memory (random access memory) or a nonvolatile memory (read-only memory, nonvolatile random access memory).

The auxiliary storage device 33 corresponds to an auxiliary storage portion of the above computer. As the auxiliary storage device 33, for example, a well-known storage device such as an SSD, an HDD, or an EEPROM is used alone or in combination of a plurality of storage devices. The auxiliary storage device 33 stores data used when the processor 31 performs various processing, data created by the processing in the processor 31, or the like. The auxiliary storage device 33 may store the application program described above.

The communication interface 34 is an interface with each scanner 10. The communication interface 34 transmits and receives data signals to and from each scanner 10 connected via the communication network 40 according to a predetermined communication protocol.

In the image recognition server 30 having such a configuration, the processor 31 has functions as a reception unit 311, a recognition unit 312, and a transmission unit 313. The reception unit 311 has a function of receiving an image of a product sent from the scanner 10 via the communication network 40. The reception unit 311 can also be called a server-side reception unit.

The recognition unit 312 has a function of recognizing the price change information displayed on the price change label 53 from the image of the product received by the reception unit 311. As a technique for recognizing the price change information from the image, an existing technique is used. The recognition unit 312 can also be called a server-side recognition unit.

The transmission unit 313 has a function of transmitting the price change information recognized by the recognition unit 312 to the scanner 10 which is a transmission source of the recognized image. The transmission unit 313 can also be called a server-side transmission unit.

Figure 4:
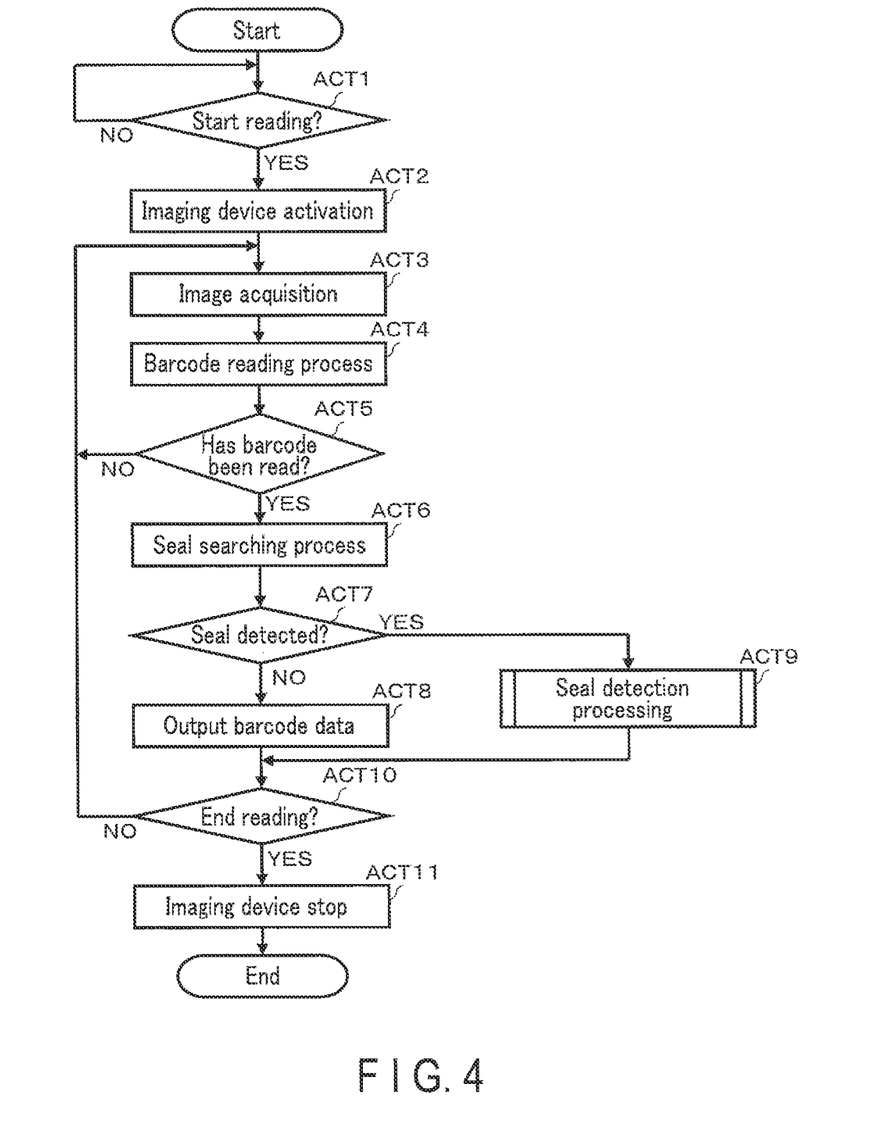
FIG. 4 is a flowchart showing a procedure of main information processing performed by a processor of the scanner according to a code reading program.
Figure 5:
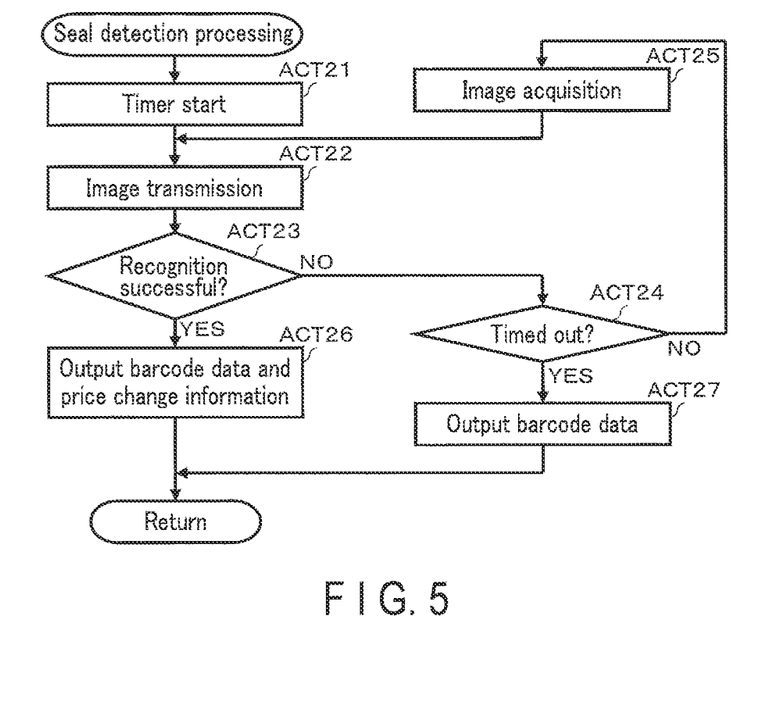
FIG. 5 is a flowchart showing a specific procedure of seal detection processing in FIG. 4 in the first embodiment.

FIGS. 4 and 5 are flowcharts showing a procedure of main information processing performed by the processor 11 of the scanner 10 according to a code reading program. That is, the processor 11 causes the scanner 10 to function as a code reading device according to the code reading program. A main operation of the scanner 10 will be described below with reference to the flowcharts. Note that the procedure of the information processing is not limited to that according to the flowcharts. As long as similar effects can be obtained, the procedure can be modified as appropriate.

The processor 11 waits for input of a reading start command as ACT1. The reading start command is given from a corresponding POS terminal 20. For example, upon settlement of a transaction with an immediately preceding customer in the POS terminal 20, a reading start command is output from the POS terminal 20 to the scanner 10. If the reading start command is input, the processor 11 determines YES in ACT1 and proceeds to ACT2. The processor 11 outputs an activation signal to the imaging device 16 as ACT2. In the imaging device 16 to which the activation signal is input, a CCD image pickup element is in an energized state. Data of an image formed on the CCD image pickup element through the reading window is output to the image memory. The image memory is a part of a volatile memory area in the main memory 12.

The processor 11 acquires an image stored in the image memory by the function of the acquisition unit 111 as ACT3. Then, the processor 11 reads a bar code 51 from the image by the function of the reading unit 112 as ACT4. The processor 11 confirms whether or not the bar code 51 has been read as ACT5. If the bar code 51 has not been read from the image, the processor 11 determines NO in ACT5 and returns to ACT3. That is, the processor 11 sequentially acquires images from the image memory, and repeats a process of reading the bar code 51 from the images. As a result, if the bar code 51 has been read, the processor 11 determines YES in ACT5 and proceeds to ACT6.

The processor 11 determines whether or not a price change label 53 is affixed to the product by the function of the determination unit 113 as ACT6. Specifically, the processor 11 searches for a flag seal 54 from the image in which the bar code 51 has been read. The processor 11 confirms whether or not the flag seal 54 has been detected as ACT7.

If the price change label 53 is not affixed to the product, the flag seal 54 is not detected. If the flag seal 54 cannot be detected, the processor 11 determines NO in ACT7 and proceeds to ACT8. The processor 11 outputs data of the bar code 51 to the POS terminal 20 through the terminal interface 17 by the function of the output unit 116 as ACT8.

If the price change label 53 is affixed to the product, the flag seal 54 is detected in principle. If the flag seal 54 can be detected, the processor 11 determines YES in ACT7 and proceeds to ACT9. The processor 11 performs seal detection processing as ACT9. The seal detection processing will be described later.

If the processor 11 ends the process of ACT8 or ACT9, the processor 11 proceeds to ACT10. The processor 11 confirms whether or not a reading end command is input as ACT10. The reading end command is given from the corresponding POS terminal 20. For example, upon a closing operation for instructing an end of registration of a product to be purchased by the customer in the POS terminal 20, the reading end command is output from the POS terminal 20 to the scanner 10. If the reading end command is not input, the processor 11 determines NO in ACT10 and returns to ACT3. The processor 11 executes the processes of ACT3 and the subsequent steps in the same manner as described above.

Upon input of the reading end command, the processor 11 determines YES in ACT10 and proceeds to ACT11. The processor 11 outputs a stop signal to the imaging device 16 as ACT11. In the imaging device 16 to which the stop signal is input, the CCD image pickup element is in a non-energized state. Thus, the processor 11 ends the information processing of the procedure shown in the flowchart of FIG. 4. The processor 11 again waits for a reading start command to be input.

FIG. 5 is a flowchart showing a specific procedure of the seal detection processing. Upon entering the seal detection processing, the processor 11 starts the timer 14 as ACT21. As ACT22, the processor 11 transmits data of an image in which the flag seal 54 is detected to the image recognition server 30 through the communication interface 15 by the function of the transmission unit 114.

Upon receiving image data through the communication interface 34 by the function of the reception unit 311, the processor 21 of the image recognition server 30 recognizes price change information displayed on the price change label 53 from an image of that image data by the function of the recognition unit 312. Upon recognizing the price change information, the processor 21 then transmits a response command of recognition success to the scanner 10 of the image data transmission source through the communication interface 34 by the function of the transmission unit 313. The recognized and obtained price change information is included in the response command of recognition success.

The processor 11 of the scanner 10 to which the image data has been transmitted confirms whether or not the response command of recognition success has been received from the image recognition server 30 by the function of the reception unit 115 as ACT23. If the response command has not been received, the processor 11 determines NO in ACT23 and proceeds to ACT24. The processor 11 confirms whether or not the timer 14 has timed out as ACT24. If the timer 14 has not timed out, the processor 11 determines NO in ACT24 and proceeds to ACT25.

The processor 11 acquires a next image from the image memory as ACT25. Then, the processor 11 returns to ACT22. That is, the processor 11 transmits the image data to the image recognition server 30. Then, the processor 11 confirms whether or not the response command of recognition success has been received. If the response command of recognition success is not received and the timer 14 has not timed out, the processor 11 acquires the next image from the image memory. Then, the processor 11 repeats the processes of ACT22 and the subsequent steps in the same manner as described above.

Upon receiving, by the function of the reception unit 115, the response command of recognition success from the image recognition server 30 through the communication interface 15 as a result of transmitting the image data to the image recognition server 30, the processor 11 determines YES in ACT23 and proceeds to ACT26. As ACT 26, the processor 11 outputs, by the function of the output unit 116, the bar code data read by the process of ACT4 and price change information included in the response command of recognition success to the POS terminal 20 through the terminal interface 17.

On the other hand, if the timer 14 times out without receiving the response command of recognition success from the image recognition server 30, the processor 11 determines YES in ACT24 and proceeds to ACT27. As ACT27, the processor 11 outputs the bar code data read by the process of ACT4 to the POS terminal 20 through the terminal interface 17 by the function of the output unit 116.

Upon completion of the process of ACT26 or ACT27, the processor 11 ends the seal detection processing. The processor 11 proceeds to the above-described ACT10 process.

In the code reading system 100 including the scanner 10 and the image recognition server 30 that operate as described above, the following working effects can be achieved. First, upon a reading start command being given from the POS terminal 20 to the scanner 10 prior to registration of a first item of products to be purchased by a customer, the imaging device 16 of the scanner 10 is activated. In this state, an operator picks up the products to be purchased by the customer one by one and holds a surface to which a bar code label 52 is affixed over the reading window of the imaging device 16. The operator may be a store clerk or may be the customer.

Upon the surface to which the bar code label 52 is affixed being held over the reading window, a bar code 51 printed on that bar code label 52 is read in the scanner 10. In the scanner 10, it is determined whether or not a flag seal 54 is attached in the vicinity of the bar code label 52. If the flag seal 54 is not attached, that is, if a bar code 51 of a product which is not a price change target is read, data of that bar code 51 is output from the scanner 10 to the POS terminal 20. As a result, in the POS terminal 20, product sales data is registered at a price obtained from the data of the bar code 51.

On the other hand, if the flag seal 54 is attached, that is, if the bar code 51 of the price change target product is read, the image captured by the imaging device 16 is transmitted from the scanner 10 to the image recognition server 30. In the image recognition server 30, price change information displayed on the price change label 53 is recognized from that image. Upon recognition of the price change information, the price change information of the price change label 53 is output from the scanner 10 to the POS terminal 20 together with the data of the bar code 51. As a result, in the POS terminal 20, product sales data is registered at a price obtained by changing the price obtained from the data of the bar code 51 using the price change information.

As described above, in the code reading system 100, when the price change target product to which the price change label 53 is affixed together with the bar code label 52 is registered, the process of reading the bar code 51 from the image captured by the imaging device 16 is performed by the scanner 10, and the process of recognizing the price change information displayed on the price change label 53 is performed by the image recognition server 30. In this case, the image transmitted from the scanner 10 to the image recognition server 30 via the communication network 40 is an image captured by the imaging device 16 from when the flag seal 54 is detected to when the price change information is recognized. There is a high likelihood that the image in which the flag seal 54 is detected will include the image of the price change label 53. Therefore, it is possible to prevent a useless image which is not related to the recognition of the price change information from being transmitted from the scanner 10 to the image recognition server 30. As a result, even when a plurality of scanners 10 are connected to the communication network 40, the data communication amount of the communication network 40 can be reduced.

Even if the image recognition server 30 fails to recognize the price change information, the transmission of the image ends when the timeout time of the timer 14 elapses after the flag seal 54 is detected. Therefore, also from this point of view, there is an effect wherein useless image transmission can be suppressed.

In the code reading system 100, the recognition processing of the price change information displayed on the price change label 53 is performed by the image recognition server 30. Therefore, even if a format of the price change label 53 is changed, it is only necessary to add a new image recognition algorithm corresponding to the changed format to the image recognition server 30. Therefore, there is an advantage wherein it is possible to easily cope with the format change of the price change label 53 regardless of the number of the scanners 10.

Second Embodiment

Next, a second embodiment will be described with reference to FIGS. 6 and 7. Note that FIGS. 1, 2, and 4 described in the first embodiment are used in common in the second embodiment. Therefore, descriptions thereof are omitted.

Figure 6:
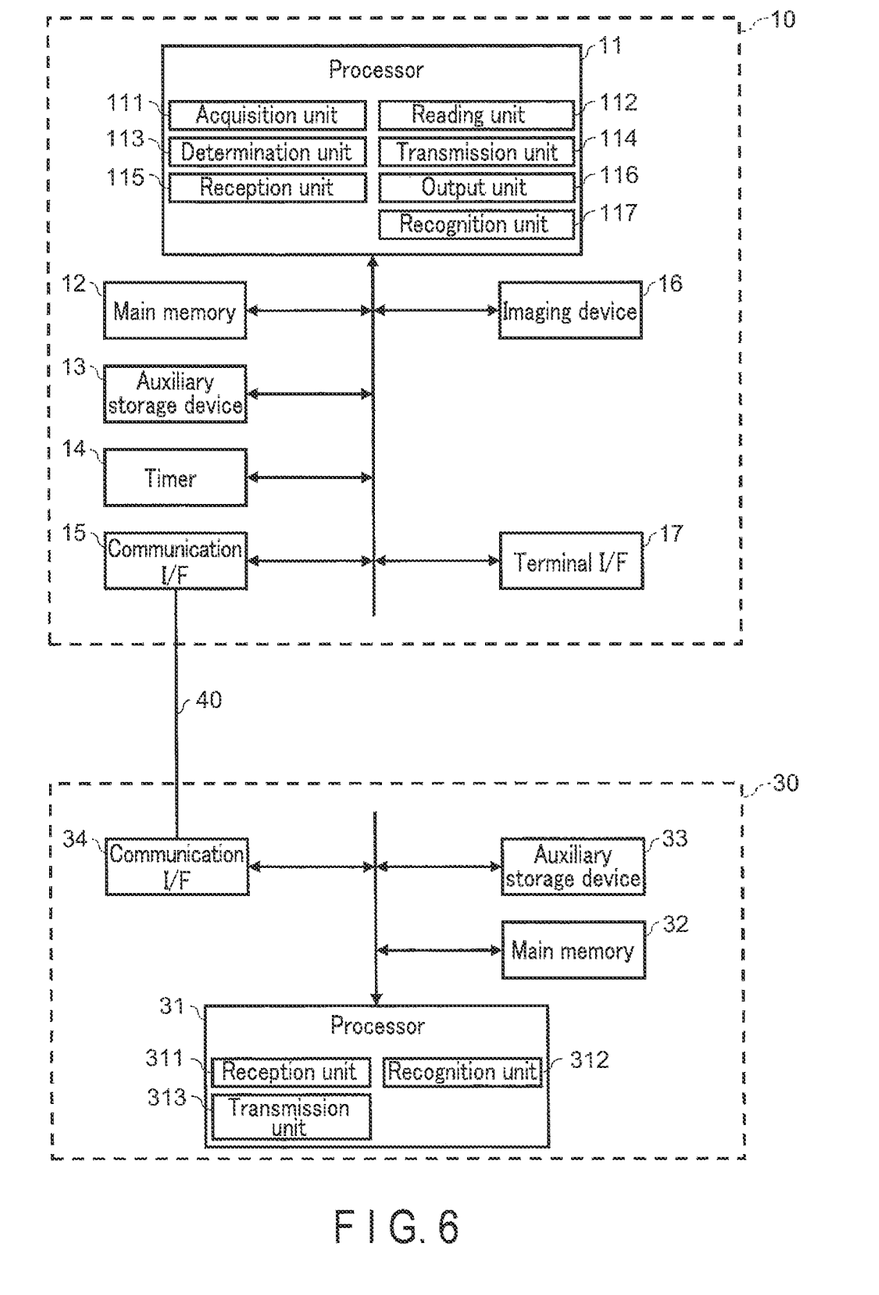
FIG. 6 is a block diagram showing a main circuit configuration of a scanner and an image recognition server in a second embodiment.

FIG. 6 is a block diagram showing a main circuit configuration of the scanner 10 and the image recognition server 30 in the second embodiment. In FIG. 6, portions common to those in FIG. 3 showing the same block diagram of the first embodiment are denoted by the same reference numerals. As is apparent from a comparison between FIGS. 6 and 3, the second embodiment is different from the first embodiment in that the processor 11 of the scanner 10 has a function as the recognition unit 117.

The recognition unit 117 is a function of recognizing price change information displayed on a price change label 53 from an image of a product. As a technique for recognizing the price change information from the image, an existing technique is used. The recognition unit 117 can also be called a device-side recognition unit.

Figure 7:
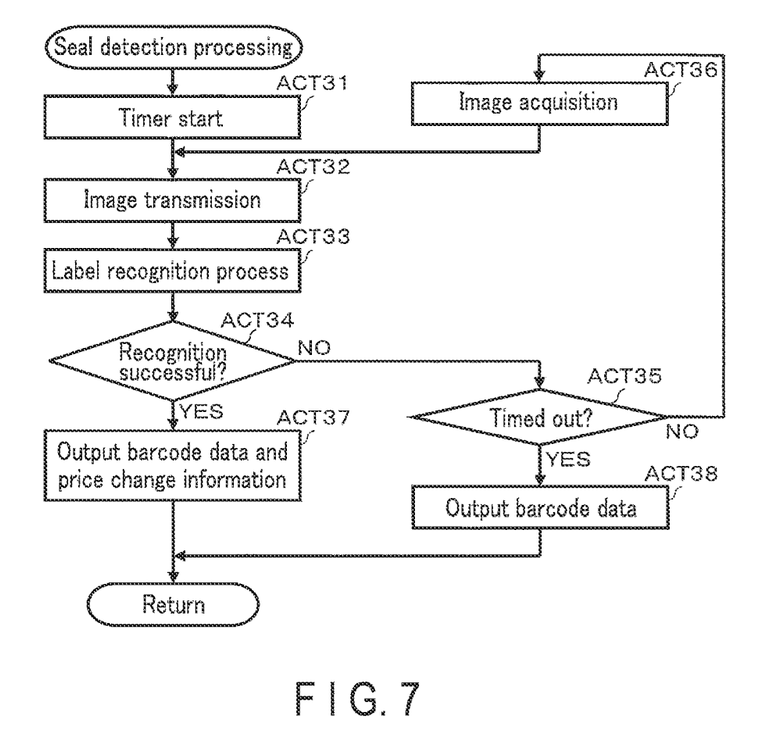
FIG. 7 is a flowchart showing a specific procedure of the seal detection processing in FIG. 4 in the second embodiment.

FIG. 7 is a flowchart showing a specific procedure of seal detection processing. In the second embodiment, the part of the seal detection processing that is indicated by ACT9 in FIG. 4 is different from that in the first embodiment.

In the second embodiment, when entering the seal detection processing, the processor 11 starts the timer 14 as ACT31. Then, as ACT 32, the processor 11 transmits, by the function of the transmission unit 114, the data of the image in which the flag seal 54 is detected to the image recognition server 30 through the communication interface 15. Further, as ACT33, the processor 11 recognizes, by the function of the recognition unit 117, the price change information displayed on the price change label 53 from the image in which the flag seal 54 is detected.

Also in the second embodiment, upon receiving the image data through the communication interface 34 by the function of the reception unit 311, the processor 21 of the image recognition server 30 recognizes the price change information displayed on the price change label 53 from the image of that image data by the function of the recognition unit 312. Upon recognizing the price change information, the processor 21 then transmits, by the function of the transmission unit 313, a response command of recognition success to the scanner 10 of the image data transmission source through the communication interface 34. The response command of recognition success includes the recognized price change information.

The processor 11 that has finished the processes of ACT32 and ACT33 confirms whether or not the recognition of the price change information has succeeded as ACT34. If the recognition is not successful, the processor 11 determines NO in ACT34 and proceeds to ACT35. The processor 11 confirms whether or not the timer 14 has timed out as ACT35. If the timer 14 has not timed out, the processor 11 determines NO in ACT35 and proceeds to ACT36.

The processor 11 acquires a next image from the image memory as ACT36. Then, the processor 11 returns to ACT32. That is, the processor 11 transmits the image data to the image recognition server 30. Further, the processor 11 recognizes the price change information displayed on the price change label 53 from that image. Then, the processor 11 confirms whether or not the recognition of the price change information has succeeded. If the recognition of the price change information is not successful and the timer 14 has not timed out, the processor 11 acquires the next image from the image memory. Then, the processor 11 repeats the processes of ACT32 and the subsequent steps in the same manner as described above.

If the price change information is successfully recognized by the function of the recognition unit 117 or the response command of recognition success is received from the image recognition server 30 by the function of the reception unit 115, the processor 11 determines YES in ACT34 and proceeds to ACT37. As ACT37, the processor 11 outputs the bar code data read in the process of ACT4 and the price change information which is successfully recognized to the POS terminal 20 through the terminal interface 17 by the function of the output unit 116.

On the other hand, in a case where the recognition unit 117 cannot recognize the price change information and the timer 14 times out without receiving the response command of recognition success from the image recognition server 30, the processor 11 determines YES in ACT35 and proceeds to ACT38. As ACT38, the processor 11 outputs the bar code data read by the process of ACT4 to the POS terminal 20 through the terminal interface 17 by the function of the output unit 116.

Upon completion of the process of ACT37 or ACT38, the processor 11 ends the seal detection processing. The processor 11 proceeds to the process of ACT10 in FIG. 4.

As described above, in the second embodiment, upon detection of the flag seal 54 by the function of the determination unit 113 from the image of the product of which the bar code 51 is read by the function of the reading unit 112, the scanner 10 transmits the image to the image recognition server 30 by the function of the transmission unit 114. Further, the scanner 10 recognizes the price change information displayed on the price change label 53 from that image by the function of the recognition unit 117.

If the price change information is recognized by the function of the recognition unit 117, the scanner 10 outputs the data of the bar code 51 and the price change information to the POS terminal 20 by the function of the output unit 116. Even in a case where the recognition unit 117 cannot recognize the price change information, if the price change information recognized by the image recognition server 30 is received by the function of the reception unit 115, the data of the bar code 51 and the price change information are output to the POS terminal 20 by the function of the output unit 116.

Therefore, in the POS terminal 20, not only in a case where the price change information is recognized by the recognition unit 312 of the image recognition server 30 but also in a case where the price change information is recognized by the recognition unit 117 of the scanner 10, the product sales data is registered at the price obtained by changing the price obtained from the data of the bar code 51 using the price change information.

Normally, there is a high likelihood that the image in which the flag seal 54 is detected will include the image of the price change label 53. Therefore, if the format of the price change label 53 corresponds to an image recognition algorithm prepared by the scanner 10, there is a high likelihood that the price change information will first be recognized by the recognition unit 117. That is, since it is not necessary to wait until the price change information is recognized in the image recognition server 30, it is possible to increase the processing efficiency of the product registration. In addition, in a case where the price change information is first recognized by the recognition unit 117 before the timer 14 times out, since the subsequent image is not transmitted to the image recognition server 30, there is an advantage in that the data communication amount of the communication network 40 can be reduced compared to the first embodiment.

Even if the format of the price change label 53 does not correspond to the image recognition algorithm prepared by the scanner 10, the price change information can be surely recognized by preparing that algorithm by the image recognition server 30. Therefore, it is possible to cope with the format change of the price change label 53 without changing the algorithm on the scanner 10 side.

Third Embodiment

Next, a third embodiment will be described with reference to FIG. 8. Incidentally, FIGS. 1, 2, and 4 described in the first embodiment and FIG. 6 described in the second embodiment are used in common in the third embodiment. Thus, descriptions thereof are omitted.

Figure 8:
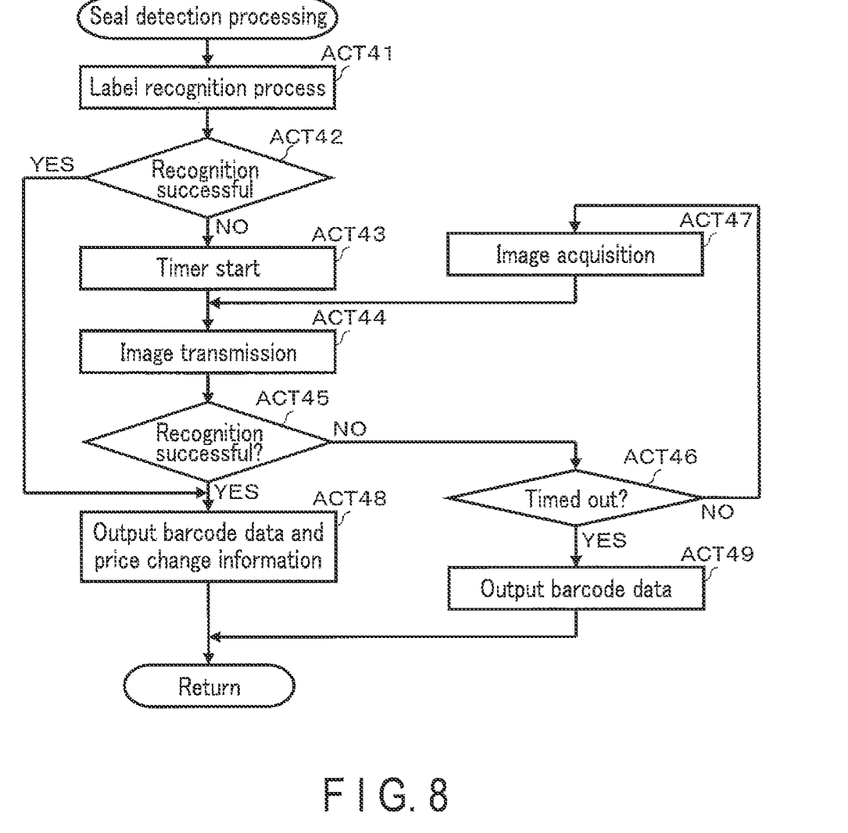
FIG. 8 is a flowchart showing a specific procedure of the seal detection processing in FIG. 4 in a third embodiment.

FIG. 8 is a flowchart showing a specific procedure of the seal detection processing. Also in the third embodiment, a part of the seal detection processing that is indicated by ACT9 in FIG. 4 is different from that in the first or second embodiment.

In the third embodiment, upon entering the seal detection processing, the processor 11 recognizes the price change information displayed on the price change label 53 from the image in which the flag seal 54 is detected by the function of the recognition unit 117 as ACT41. Normally, there is a high likelihood that the image in which the flag seal 54 is detected will include the image of the price change label 53. Therefore, if the format of the price change label 53 corresponds to an image recognition algorithm prepared by the scanner 10, there is a high likelihood that the price change information will be recognized from that image by the recognition unit 117.

The processor 11 confirms whether or not the recognition of the price change information has succeeded as ACT42. If the recognition of the price change information is successful, the processor 11 determines YES in ACT42 and proceeds to ACT48. As ACT48, the processor 11 outputs, by the function of the output unit 116, the bar code data read in the process of ACT4 and the price change information which has successfully been recognized to the POS terminal 20 through the terminal interface 17. The processor 11 ends the seal detection processing and proceeds to the process of ACT10 in FIG. 4.

On the other hand, if the image of the price change label 53 is not included in the image in which the flag seal 54 is detected, or if the format of the price change label 53 does not correspond to the image recognition algorithm prepared by the scanner 10, the recognition unit 117 cannot recognize the price change information from that image. The processor 11 determines NO in ACT42, and proceeds to ACT43. Thereafter, the processor 11 performs, as ACT43 to ACT49, the same processes as ACT22 to ACT27 described in the first embodiment.

In this way, in the third embodiment, if the flag seal 54 is detected by the function of the determination unit 113 from the image of the product of which the bar code 51 is read by the function of the reading unit 112, the scanner 10 recognizes the price change information displayed on the price change label 53 from that image by the function of the recognition unit 117. If the price change information is recognized, the scanner 10 outputs the data of the bar code 51 and the price change information to the POS terminal 20 by the function of the output unit 116.

On the other hand, if the price change information cannot be recognized, the scanner 10 transmits the image to the image recognition server 30 by the function of the transmission unit 114. Upon receiving the price change information recognized by the image recognition server 30 by the function of the reception unit 115, the scanner 10 outputs the data of the bar code 51 and the price change information to the POS terminal 20 by the function of the output unit 116.

Therefore, not only if the price change information is recognized by the recognition unit 117 of the scanner 10 but also if the price change information is not recognized, as long as the price change information is recognized by the recognition unit 312 of the image recognition server 30, in the POS terminal 20, the product sales data is registered at a price obtained by changing the price obtained from the data of the bar code 51 using the price change information.

Normally, there is a high likelihood that the image in which the flag seal 54 is detected will include the image of the price change label 53. Therefore, in the case where the format of the price change label 53 corresponds to the image recognition algorithm prepared by the scanner 10, the frequency of transmission of an image from the scanner 10 to the image recognition server 30 is significantly reduced as compared with the first or second embodiment. As a result, there is an advantage wherein the data communication amount of the communication network 40 can be reduced more than in the first or second embodiment. Further, needless to say it is possible to cope with the format change of the price change label 53 without changing the algorithm on the scanner 10 side.

The first to third embodiments have been described above, but the embodiments are not limited thereto.

For example, in the above embodiments, the case in which the scanner 10 and the POS terminal 20 are connected by a communication cable has been exemplified. As another embodiment, a device in which the scanner 10 and the POS terminal 20 are integrated, for example, a self-checkout terminal, may be an aspect of the code reading device.

The scanner 10 may include devices such as a keyboard, a touch panel, and a display, and may support registration of merchandise such as fresh food to which a bar code is not affixed. In this case, for example, when the scanner 10 is instructed by a key operation that the price change label 53 is affixed to the product by a key operation, an image acquired by the acquisition unit 111 is transmitted to the image recognition server 30 by the function of the transmission unit 114. If the price change information recognized by the image recognition server 30 is received by the function of the reception unit 115, the price change information is output to the POS terminal 20 together with the code of the product to which the bar code is not affixed by the function of the output unit 116. Even if such a configuration is adopted, it is possible to reduce the data communication amount of the communication network 40, and to easily cope with the format change of the price change label 53.

The image recognized by the image recognition server 30 is not limited to the price change information displayed on the price change label 53. For example, an operation is conceivable in which a label on which an expiration date is displayed is affixed to a product and a discount rate is changed depending on a length of a remaining period until the expiration date. In this case, the image recognized by the image recognition server 30 is information of the expiration date displayed on the label. However, since the information of the expiration date is also information for changing the price as a result, it can also be called the price change information.

The program according to the present embodiment may be transferred in a state of being stored in an electronic device, or may be transferred in a state of not being stored in an electronic device. In the latter case, the program may be transferred via a network, or may be transferred in a state of being recorded in a recording medium. The recording medium is a non-transitory tangible medium. The recording medium is a computer-readable medium. The recording medium may be any medium as long as it can store a program such as a CD-ROM or a memory card and can be read by a computer, and its form is not limited.

While certain embodiments have been described, these embodiments have been presented by way of examples only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. These embodiments and modifications thereof are included in the scope and spirit of the invention, and are also included in the invention described in the claims and the equivalent scope thereof.

The invention claimed is:

1. A code reading device comprising:
    an acquisition unit configured to acquire an image of a product captured by an imaging device;
    a reading unit configured to read a code for obtaining a price of the product from the image of the product acquired by the acquisition unit;
    a determination unit configured to determine whether or not a label displaying price change information related to a change in the price obtained by the code is affixed to the product;
    a transmission unit configured to transmit the image of the product to an image recognition server for recognizing the price change information displayed on the label if the determination unit determines that the label is affixed to the product;
    a reception unit configured to receive the price change information recognized by the image recognition server; and
    an output unit configured to output the code read by the reading unit to a processing device that processes sales data of the product if the determination unit determines that the label is not affixed to the product, and to output the code read by the reading unit and the price change information received by the reception unit to the processing device if the determination unit determines that the label is affixed to the product.

2. The code reading device according to claim 1, further comprising a recognition unit configured to recognize the price change information displayed on the label,
    wherein in a case where the determination unit determines that the label is affixed to the product, the output unit is configured to, if the recognition unit recognizes the price change information before the reception unit receives the price change information, output the code read by the reading unit and the price change information recognized by the recognition unit to the processing device, and to, if the reception unit receives the price change information before the recognition unit recognizes the price change information, output the code read by the reading unit and the price change information received by the reception unit to the processing device.

3. The code reading device according to claim 1, further comprising a recognition unit configured to recognize the price change information displayed on the label, wherein the transmission unit is configured to transmit the image of the product to the image recognition server if the determination unit determines that the label is affixed to the product and the recognition unit does not recognize the price change information, and in a case where the determination unit determines that the label is affixed to the product, the output unit is configured to output the code read by the reading unit and the price change information recognized by the recognition unit to the processing device if the price change information is recognized by the recognition unit, and to output the code read by the reading unit and the price change information received by the reception unit to the processing device if the price change information is not recognized by the recognition unit.

4. A code reading system comprising a plurality of code reading devices and an image recognition server,
wherein the code reading devices include:
an acquisition unit configured to acquire an image of a product captured by an imaging device;
a reading unit configured to read a code for obtaining a price of the product from the image of the product acquired by the acquisition unit;
a determination unit configured to determine whether or not a label displaying price change information related to a change in the price obtained by the code is affixed to the product;
a device-side transmission unit configured to transmit the image of the product to the image recognition server if the determination unit determines that the label is affixed to the product;
a device-side reception unit configured to receive the price change information recognized by the image recognition server; and
an output unit configured to output the code read by the reading unit to a processing device that processes sales data of the product if the determination unit determines that the label is not affixed to the product, and to output the code read by the reading unit and the price change information received by the device-side reception unit to the processing device if the determination unit determines that the label is affixed to the product, and
the image recognition server includes:
a server-side reception unit configured to receive the image of the product from the code reading device;
a server-side recognition unit configured to recognize the price change information from the image of the product received by the server-side reception unit; and
a server-side transmission unit configured to transmit the price change information recognized by the server-side recognition unit to the code reading device that is a transmission source of the image.

5. The code reading system according to claim 4, wherein the code reading device further comprises a device-side recognition unit configured to recognize the price change information displayed on the label, and in a case where the determination unit determines that the label is affixed to the product, the output unit is configured to, if the device-side recognition unit recognizes the price change information before the device-side reception unit receives the price change information, output the code read by the reading unit and the price change information recognized by the device-side recognition unit to the processing device, and to, if the device-side reception unit receives the price change information before the device-side recognition unit recognizes the price change information, output the code read by the reading unit and the price change information received by the device-side reception unit to the processing device.

6. The code reading system according to claim 4, wherein the code reading device further comprises a device-side recognition unit configured to recognize the price change information displayed on the label, the device-side transmission unit is configured to transmit the image of the product to the image recognition server if the determination unit determines that the label is affixed to the product and the price change information is not recognized by the device-side recognition unit, and in a case where the determination unit determines that the label is affixed to the product, the output unit is configured to output the code read by the reading unit and the price change information recognized by the device-side recognition unit to the processing device if the price change information is recognized by the device-side recognition unit, and to output the code read by the reading unit and the price change information received by the device-side reception unit to the processing device if the price change information is not recognized by the device-side recognition unit.

7. A program recording medium storing a program for causing a computer of a code reading device to execute:
acquiring an image of a product captured by an imaging device;
reading a code for obtaining a price of the product from the image of the product;
determining whether or not a label displaying price change information related to a change in the price obtained by the code is affixed to the product;
if it is determined that the label is affixed to the product, transmitting the image of the product to an image recognition server for recognizing the price change information displayed on the label;
receiving the price change information recognized at the image recognition server; and
if it is determined that the label is not affixed to the product, outputting the read code to a processing device that processes sales data of the product, and if it is determined that the label is affixed to the product, outputting the read code and the received price change information to the processing device.

8. The program recording medium according to claim 7, the medium storing the program for causing the computer to further execute:
recognizing, by a recognition unit, the price change information displayed on the label; and
if it is determined that the label is affixed to the product and the price change information is recognized by the recognition unit before the price change information is received, outputting the read code and the price change information recognized by the recognition unit to the processing device, and if it is determined that the label is affixed to the product and the price change information is received before the price change information is recognized by the recognition unit, outputting the read code and the received price change information to the processing device.

9. The program recording medium according to claim 7, the medium storing the program for causing the computer to further execute:
recognizing, by a recognition unit, the price change information displayed on the label;

transmitting the image of the product to the image recognition server if it is determined that the label is affixed to the product and the price change information is not recognized by the recognition unit; and if it is determined that the label is affixed to the product and the price change information is recognized by the recognition unit, outputting the read code and the price change information recognized by the recognition unit to the processing device, and if the price change information is not recognized by the recognition unit, outputting the read code and the received price change information to the processing device.

10. A code reading method comprising:

acquiring, by an acquisition unit, an image of a product captured by an imaging device;

reading, by a reading unit, a code for obtaining a price of the product from the image of the product acquired by the acquisition unit, and determining, by a determination unit, whether or not a label displaying price change information related to a change in the price obtained by the code is affixed to the product;

if it is determined that the label is not affixed to the product, outputting, by an output unit, the code read by the reading unit to a processing device that processes sales data of the product; and if it is determined that the label is affixed to the product, transmitting, by a transmission unit, the image of the product to an image recognition server for recognizing the price change information displayed on the label, and if a reception unit receives the price change information recognized by the image recognition server, outputting, by the output unit, the code read by the reading unit and the price change information received by the reception unit to the processing device.

11. The code reading method according to claim 10, the method comprising:

if it is determined that the label is affixed to the product, recognizing, by a recognition unit, the price change information displayed on the label, and transmitting, by a transmission unit, the image of the product to the image recognition server; and if the price change information is recognized by the recognition unit before the price change information is received by the reception unit, outputting, by the output unit, the code read by the reading unit and the price change information recognized by the recognition unit to the processing device, and if the price change information is received by the reception unit before the price change information is recognized by the recognition unit, outputting the code read by the reading unit and the price change information received by the reception unit to the processing device.

12. The code reading method according to claim 10, the method comprising:

recognizing, by a recognition unit, the price change information displayed on the label if it is determined that the label is affixed to the product;

transmitting, by the transmission unit, the image of the product to the image recognition server if the price change information is not recognized by the recognition unit; and in a case where it is determined that the label is affixed to the product, if the price change information is recognized by the recognition unit, outputting, by the output unit, the code read by the reading unit and the price change information recognized by the recognition unit to the processing device, and if the price change information is not recognized by the recognition unit, outputting the code read by the reading unit and the price change information received by the reception unit to the processing device.

\* \* \* \* \*